July 4, 1972    M. A. E. RHIANDO    3,674,395

MOULDING APPARATUS

Filed Aug. 12, 1970    5 Sheets-Sheet 1

Inventor
Maxwell Alvin Earl
Rhiando
By Cushman, Darby & Cushman
Attorneys

July 4, 1972   M. A. E. RHIANDO   3,674,395
MOULDING APPARATUS

Filed Aug. 12, 1970   5 Sheets-Sheet 4

Inventor
Maxwell Alvin Earl
Rhiando
By Cushman, Darby & Cushman
Attorneys

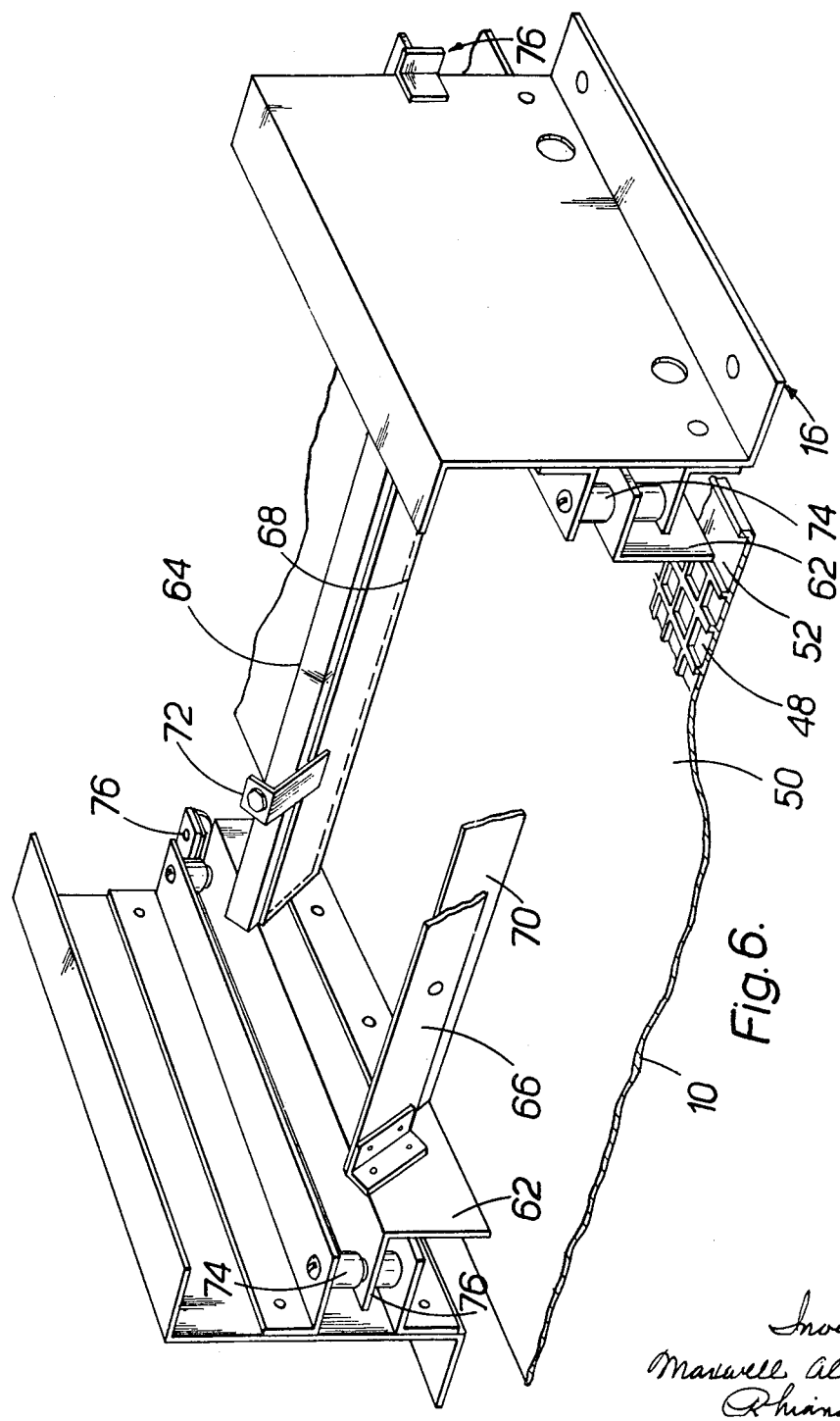

United States Patent Office 3,674,395
Patented July 4, 1972

3,674,395
MOULDING APPARATUS
Maxwell Alvin Earl Rhiando, "Stonecroft" Friary Road, South Ascot, Berkshire, England
Filed Aug. 12, 1970, Ser. No. 63,222
Int. Cl. B29c 3/02, 3/04
U.S. Cl. 425—115                9 Claims

ABSTRACT OF THE DISCLOSURE

The invention relates to the production of moulded articles and more particularly to moulded articles for use as prefabricated surface coverings or veneers. The invention is concerned with a method of making a moulded article comprising introducing a granular or particulate filler material into a mould, applying a foraminous backing layer to the filler material and applying a settable binding material to the filler material before or after the application of the backing layer so as to coat sufficient of the surface of the granules to effect a bond between the granules and between the granules and the backing layer when the settable binding material is cured and hardens. Apparatus for putting the method into effect is also of interest and various alternative embodiments are disclosed.

The invention relates to the production of moulded articles and more particularly to moulded articles for use as prefabricated surface coverings or veneers.

According to one aspect of the invention apparatus for moulding an article comprises an open mould, a first dispenser for feeding granular or particulate material into the mould, a second dispenser for applying a foraminous layer to material fed into the mould and a press for compressing fed material into the mould, means for displacing at least the mould and the press relative to one another, the granules or particles having a coating of binding material applied to a major proportion of the surfaces thereof so that when the binding material is cured, the foraminous layer adheres to the moulded article.

If desired, and in circumstances when the apparatus is stationary, the mould may be moved relatively to the press and dispensers. However, the apparatus of this invention may be included in apparatus for laying moulded articles on to, for example, road or other surfaces in which case the press may be mounted for displacement relative to the mould and the dispensers.

Preferably the apparatus includes a conveyor belt for moving the mould relative to the dispensers and through the press. Further, the conveyor belt preferably includes a plurality of open moulds.

The apparatus, according to one preferred embodiment of the invention includes a conveyor press of the type described and claimed in my co-pending application Ser. No. 56,579, filed July 20, 1970. Where such a press is used the moulded conveyor belt is passed between the platens thereof.

According to another embodiment of this invention, the apparatus includes a first dispenser comprising a hopper adapted to feed a predetermined quantity of the granular or particulate filler material into moulds in a mould conveyor displaceable beneath the dispenser and positioned, with respect to the direction of motion of the belt, such that either a third dispenser applies a layer of binding material to the surface of each mould prior to the filler material being fed to the moulds or such that the binding material is applied to the filler material in each mould or to the foraminous layer previously applied to the material in the moulds.

Preferably a fourth dispenser is included to dispense a thin film of plastics material which acts to cover the mould and materials dispensed on to the moulded conveyor prior to entry of the press.

The film of plastics material and the foraminous layer are each preferably applied in a continuous length by means of a reel type dispenser adapted to dispense the material or layer at a rate corresponding to the speed of the moulded conveyor belt.

According to another aspect of this invention a method of making a moulded article comprises introducing a granular or particulate filler material into a mould, applying a foraminous backing layer to the filler material and applying a settable binding material to the filler material before or after the application of the backing layer so as to coat sufficient of the surface of the granules to effect a bond between the granules and between the granules and the backing layer when the settable binding material is cured and hardens.

Preferably the filler material is mixed or pre-coated with the binding material before it is fed into the mould but if desired, a quantity of binding material may be introduced into the mould before the filler material is fed into the mould. Alternatively, the binding material may be fed into the mould after the filler material and/or after the foraminous layer has been applied. The mould and the materials dispensed therein are thereafter subject to pressure for a predetermined period in order to distribute the binding material throughout the filler material. Conveniently, the binding material is a thermosetting material.

The invention will now be described by way of example with reference to the accompanying drawings of which:

FIGS. 1 and 2 each show one embodiment of an apparatus for moulding an article;

FIG. 6 shows a dispenser for filler materials.

Figure 1:
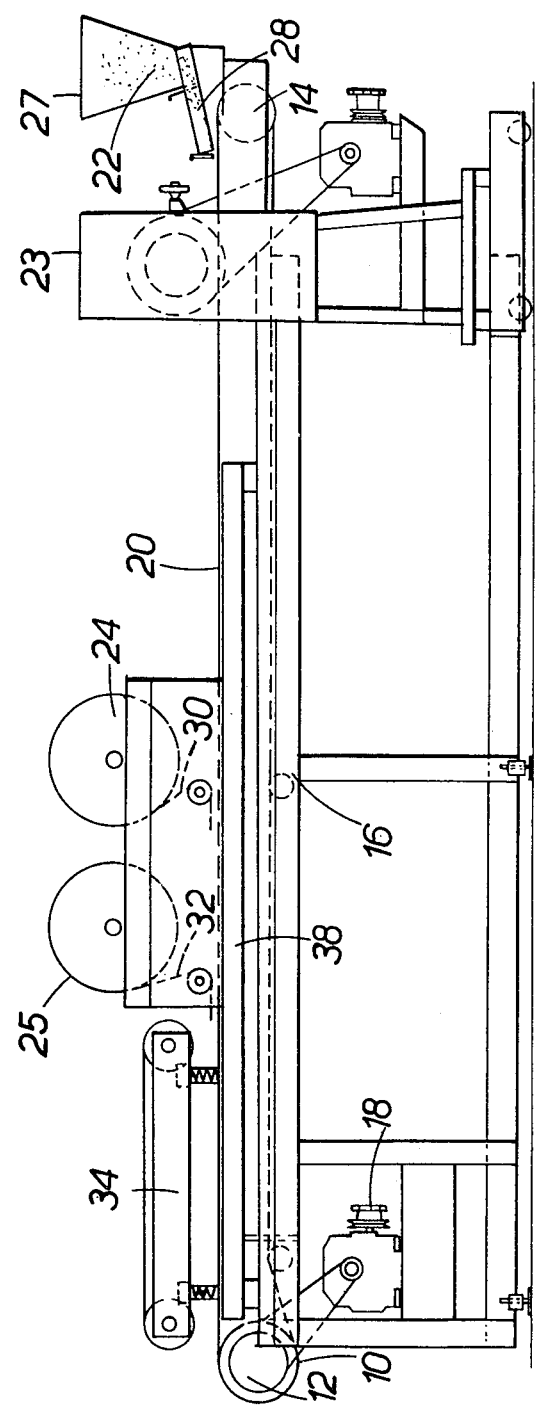

FIG. 1 shows a conveyor belt 10 mounted on pulleys 12 and 14 which are supported by a frame 16. The pulley 12 is driven in the direction of the arrow shown by a variable speed drive unit 18. The conveyor belt 10 is a moulded conveyor belt and is shown in more detail in FIG. 3.

Above the moulded surface 20 of the conveyor belt 10 are situated four dispensers 22, 23, 24 and 25. A hopper 27 and a tray or elongated tube or slide 28 constitute the dispenser 22 and a granular or particulate filler material is fed therefrom at a predetermined rate which corresponds to the selected speed of the belt into the moulds formed in the surface of belt 10.

A thermosetting binding material is applied to the filler material in the moulds from the dispenser 23 and, subsequently, a reinforcing mesh 30, more generally described as a foraminous layer, is applied onto the surface of the belt by the dispenser 24. Thereafter, a film of plastics material 32 is laid on top of the reinforcing mesh by the dispenser 25.

The belt 10 then passes beneath a conveyor press 34 and the various layers dispensed onto the belt are compressed into the mould such that the thermosetting material is squeezed between the grains of the filler material, thereby coating the grains and, when the thermosetting material is cured and hardens, the filler material is bonded thereby.

The action of the press is such that the reinforcing mesh becomes embedded in the surface of each moulded article and thus a plurality of moulded articles attached to a continuous length of reinforcing mesh are produced whose shape, size and configuration are dependent on the form of the moulded conveyor belt 10. The plastic film serves to confine the thermosetting material to the mould and may be removed after pressing and curing has taken place.

One alternative construction of the apparatus described above is that in which the position, in respect of the direction of motion of the conveyor belt, of the dispensers 22 and 23 is reversed. The effect is simply that the mould is coated with the thermosetting material prior to feeding in the filler material. It will be appreciated that upon the application of pressure the thermosetting material will be distributed throughout the granular filler material in a similar manner.

The rate at which the reinforcing mesh and the film of plastics material is unwound from the dispensers 24 and 25 corresponds to the speed of the conveyor belt since the press grips the two materials against the conveyor and the three move through the press in unison.

Figure 2:
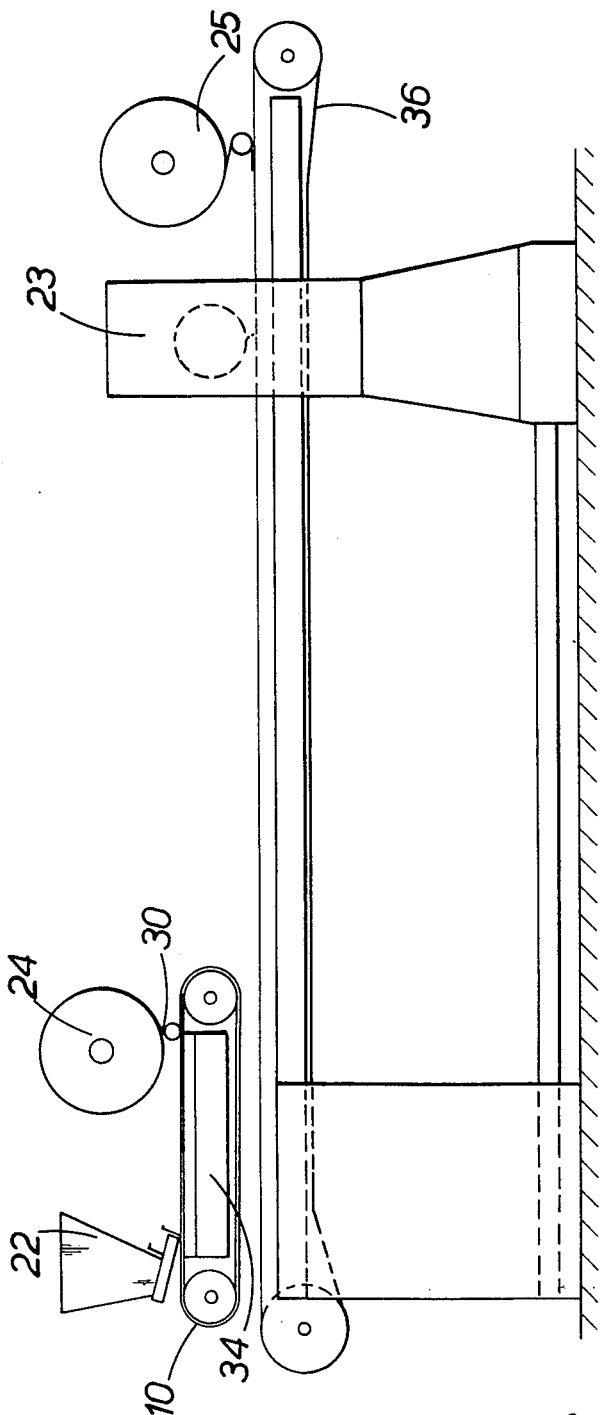

In FIG. 2 the dispensers 22 and 24 are situated above the moulded conveyor 10 which is mounted on the upper platen of a press 34. A second conveyor 36 passes beneath that upper platen. The dispensers 25 and 23 are situated above the second conveyor 36 and the film of plastics material 32 is laid on the conveyor. The thermosetting material is subsequently dispensed onto the surface of that film and the conveyor 36 then carries the coated film towards and under the upper platen of the press 34.

Filler material is fed into the moulded conveyor 10 which is arranged to move in the direction indicated by the dispenser 22 and the reinforcing mesh 30 is then applied to the surface of the belt by the dispenser 24. The dispenser 24 shown in the drawings is a freely rotatable reel and as such is only suitable for dispensing a woven or continuous reinforcing material. However non-woven materials may be used, as will be described later. The reel may include a braking means (not shown) to prevent overwinding of reinforcing material.

As the moulded conveyor 10 moves around the upper platen of the press the open moulds 20 become inverted but the filler material is retained by the reinforcing mesh. The coated film and the filled moulds on the surface of the moulded belt 10 are thus brought together on entry to the press 34 and thereafter the process continues as described above.

The thermosetting binding material may be cured and/or hardened at room temperature or at an elevated temperature and in the latter case it is convenient to heat either the upper or lower platens of the press or both. The embodiments shown in FIGS. 1 and 2 include a lower conveyor mounted on an extension to the lower platen of the press, substantially the whole of which is heated. This is especially convenient when the lower conveyor carries only the film of plastics material coated with the thermosetting material. Under such circumstances the thermosetting material will be partly cured before being brought into contact with the reinforcing mesh on entry to the press.

Figure 5:
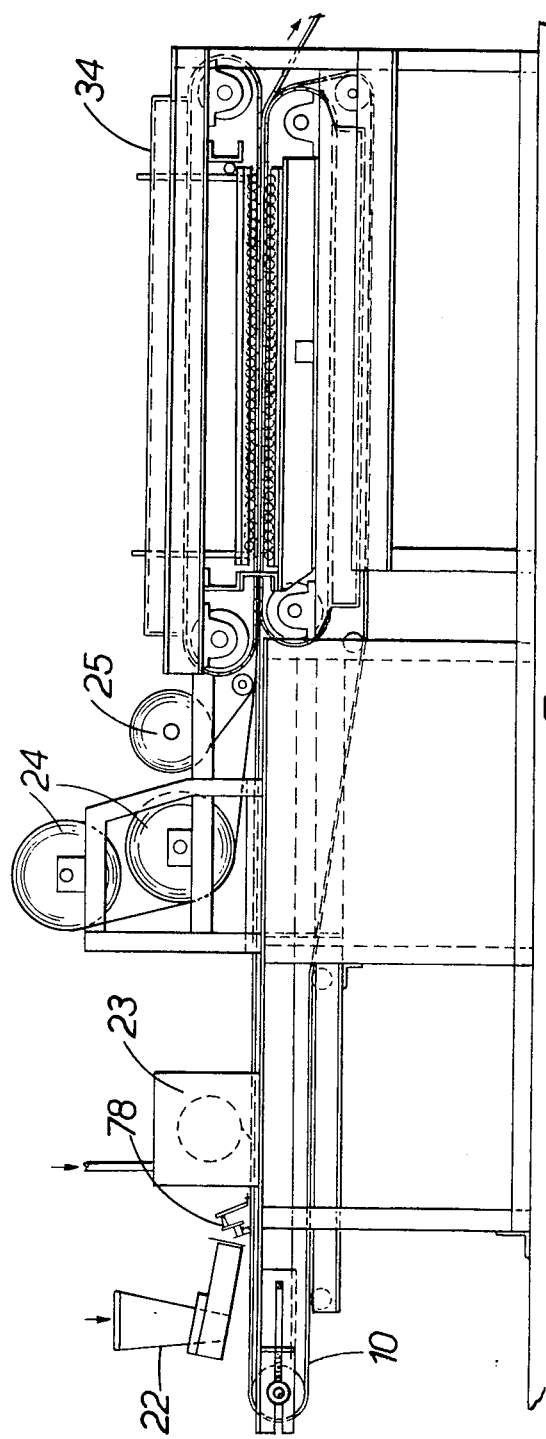
FIG. 5 shows apparatus for moulding an article including a conveyor press.

FIG. 5 shows a preferred type of conveyor press 34 which is the subject of my co-pending U.S. patent application No. 56,579, filed July 20, 1970.

Briefly, the press comprises an upper and lower platen, each of which support an endless belt. The belts, which are formed by linking together a plurality of elongated metal slats, pass between two rows of roller elements. The distance between the two rows of roller elements is adjustable to permit adjustment of the pressure to which an article, passing between the platens of the press, is subjected. The metal slats are of such a size that each slat is always in contact with two roller elements and in this way an even pressure is achieved. Further, substantial pressures may be applied, accompanied by only small friction losses since each of the roller elements in contact with the metal slats are mounted for free rotation in a frame supported on the platen.

An alternative type of press is shown in FIG. 1. The endless belts of this press do not bear against roller elements but against a platen frame 38. In order to reduce the effects of friction during compression the surfaces of the belt and the platens are coated with a material possessing a low coefficient of friction such as polytetrafluorethylene (P.T.F.E.) When a moulded conveyor belt 10 passes between the two platens of a press there is no relative movement of the three and consequently, friction wear problems, are substantially reduced by the P.T.F.E. coating.

Each of the two presses described may be modified for use in either of two configurations; the first in which the lower platen and conveyor is extended in length relative to the upper platen as shown in FIGS. 1 and 2 and a second in which a third conveyor belt is passed between the two endless belts of the press, as shown in FIG. 5.

Figure 4:
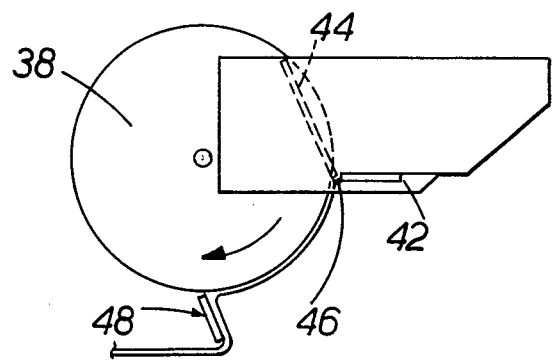
FIG. 4 shows a dispenser for settable binding material.

The dispenser 25, for applying the thermosetting material is shown in more detail in FIG. 4. A commonly used thermosetting material is a polyester resin mixed with a catalyst and/or hardener and the dispenser shown in the figure is of a type preferred for use with such a material. The catalyst and/or hardener may be mixed with the polyester resin through a metering and mixing head prior to entering the dispenser but alternatively a spray gun, for example, incorporating a metering and mixing head at the nozzle of the gun could be used.

The dispenser 23 consists of a metal or rubber roller 38 mounted for rotation in a direction corresponding to the direction of motion of the conveyor beneath. The reservoir containing the mixture of the polyester resin and catalyst is mounted adjacent the roller and includes an adjustable doctor blade 42. Scraper blades 44, attached to the sides of the reservoir, bear on the ends of the roller 38. The scraper blades 44 act to prevent any thermosetting material escaping from the reservoir other than by way of the adjustable slit 46 between the roller 38 and doctor blade 42. A film of thermosetting material is carried on the surface of the rotating roller unit until it is scraped away from that surface by a second doctor blade 48 and thence flows onto the surface beneath. This type of dispenser may be used in any of the alternative embodiments described above.

Figure 3:
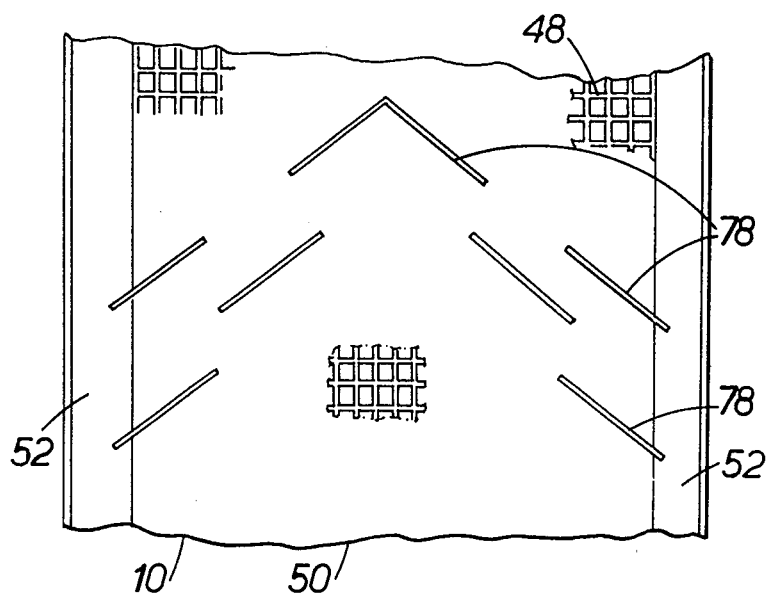
FIG. 3 shows a moulded conveyor belt.

A moulded conveyor belt 10 is shown in FIG. 3 which is a plan view of a typical belt but the particular shape and size of the moulds 48 formed in the surface of the belt 10 is determined by the shape and size of the articles to be produced. The belt 10 includes a central portion 50 in which the moulds 48 are formed and two outer channels 52 for collecting excess filler and thermosetting material. It is preferred to calender or press form the belt in a silicone or neoprene rubber or a P.T.F.E. material but, alternatively, the belts may be made by pouring the chosen material over a master belt made by hand, applying a reinforcing material and subsequently allowing the whole to cure. The material used for the belt may possess inherent release qualities or, if desired, a release coating may be subsequently applied to the belt.

As a further alternative the conveyor belt may be made from a durable material and used in conjunction with an inexpensive throw-away pre-formed surface film supported by the belt during moulding. This film could then be discarded, after moulding. If desired, the pre-formed film may be wound on a spool and carried through the press during moulding. In this way the wear of the belt and the mould surfaces could be substantially reduced.

An alternative type of filler material dispenser 22, which may also be used to dispense a mixture of the filler and thermosetting materials in, for example a 6:1 ratio, is shown in FIG. 6. A hopper 60 having sides 62 which extend below the upper surface of the central portion 50 of the belt 10 into the outer portion 52 is suspended immediately above the surface of the belt. The hopper has no base and thus a mixture of filler material and settable binding material placed in the hopper is supported by the central portion of the belt thus filling the moulds 48. The two end plates 64 and 66 included at an angle to the surface of the belt are each fitted with doctor blades 68 and 70. Each plate is inclined such that the tip of the doctor blade is advanced in the direction of motion of the belt. The front plate (in respect of the direction of motion of the belt) is fitted with a screw means 72 which permits adjustment of the height of the tip of the doctor blade 68 above the belt. In operation the doctor blade 68 ensures that excess filler or filler and thermosetting material is not deposited on the upper surface of the central portion 50 of the belt 10. The hopper is not rigidly mounted but is located and supported by flanges 76, attached to the side plates, on four ball units 74 at a selected height above the belt. Two roller stops 76 retain the hopper against movement in the direction of motion of the belt but, in combination with the four ball support units, permit limited lateral movement.

A series of doctor blades 78, transverse to the belt, are used in conjunction with a dispenser of the "filler feed unit" type to deflect excess material from the central portion 50 into the outer channels 52. The position of these doctor blades is shown in FIG. 3 which is a plan view of a moulded conveyor belt.

The configuration of the apparatus described determines the sequence of operations for producing a moulded article.

One preferred sequence is to dispense the aggregate onto the moving moulded conveyor belt whose divisions are of such a height as to allow the aggregate filler material to be below the open surface of the mould, to dispense the settable binding material onto the belt so that the binding material covers both the aggregate material and the mould divisions, the binding material being sufficiently thixotropic to prevent the resin binder from draining through the aggregate onto the surface of the belt, to apply the reinforcing mesh and the plastic film and finally to compress the materials into the mould and permit the settable binder to cure. This procedure corresponds to the configuration shown in FIG. 1. Where it is desired to make a terrazzo-type moulding using large aggregate filler the thermosetting binding resin is chosen so that the resin flows to the base of the mould.

Alternatively, the settable binding material is dispensed onto the pre-formed plastic film and, subsequently, brought in contact with the moulded conveyor containing the aggregate material and covered by the reinforcing mesh before the materials enter the press and are compressed into the mould.

In both cases heat may be applied to the contents of the moulded conveyor in order to assist the curing of the settable binding material. After curing, the moulded articles, attached together by the reinforcing mesh, are removed from the moulds and may be wound into a roll for storage.

There are many uses for moulded articles made according to this invention, some of which will be described below. The particular constituents used and the form of parts of the apparatus for example, the moulded conveyor belt 10, depends to a large extent on the application to which the moulded articles are to be put.

With reference to the constituents of a filler settable binding material it should be stated that any suitable granular or particulate filler material and any settable binding material, organic or inorganic, may be used.

Examples of suitable filler materials coated, or uncoated are:

Calcined aluminum silicate, kaolin, bauxite, flint, silicon carbide, marble, quartz, granite, sand, ceramic frit, ceramic coated mineral aggregates, glass or plastics material spheres or chippings, whiting, mica, aluminum and metallized plastics materials.

The settable binding or bonding material may be inorganic, for example, portland cement or plaster of Paris or organic and may be clear or pigmented depending on the intended application. An organic settable resin binder is preferred and this binder may contain a fine-filler such as calcium silicate, talc, sand or whitening in order to reduce the cost and, further, may include a thixotropic additive such as silicon dioxide.

A moulded article may also include a fire or flame resistant agent such as trichlorethyl phosphate or pentabromotolueneantimony.

Examples of typical settable resin binders are as follows: isophthalic or orthophthalic polyesters, epoxy, melamine, urea formaldehyde, phenolic, bisphenol A or unsaturated polyester resins, polyurethanes and vinyl copolymers in aqueous solvent form or combinations thereof, casting resins based on amino, acrylic, epoxy/polyamide or epoxy/tar derivatives and thermoplastic resins such as polythene, polycarbonates, acrylics, polyvinylchloride, hydrocarbon polymers, resin, plastisols or derivatives thereof.

Suitable catalysts and accelerators for use in curing the resinous composition at room temperatures are methyl-ethyl ketone peroxide and cobalt naphthanate or, at elevated temperatures, benzoyl peroxide or peroxide types, peresters, acid hardeners etc. depending on the type of resin used.

The moulded articles are joined together by a reinforcing mesh or more generally a foraminous layer bonded to the article prior to curing. Typical reiforcing materials are polynosic or rayon type materials, glass fibre, flax, carbon cotton, cellulose, asbestos, metal, hessian, jute, nylon and other such materials capable of being woven. However, the reinforcement may be formed by laying non-woven strands adjacent each other and applying a coating of a suitable binding agent or size. A reinforcing mesh of this type, having a mesh size of between $\frac{1}{16}$ inch to 1 inch, may thus be stored on and dispensed from a reel.

The film of plastics material is preferably not thicker than 0.005 inch thick and is made of a cheap nonabsorbent material such as cellophane, a cellulose derivative or a derivative of polyethylene or polyvinyl chloride. A film made of straw or kraft paper treated with a nonabsorbent material may also be used.

One area in which the invention is found to be particularly useful is in the manufacture of mosaics and tiles or the like for use in the construction and decoration of buildings.

A moulded conveyor is chosen having, in its surface, moulds of the desired shape and size and in the desired configuration and the materials are selected according to the properties required in the particular application. For example, the tiles for a terrace or patio could be made in this way and could include stones or small pebbles embedded in a pigmented settable binding material. The tiles would be attached together by the reinforcing mesh and therefore may be laid by simply applying a grouting material in the gaps between the tiles which would set to retain the reinforcing mesh and therefore the tiles in position.

The application may be extended to include an antiskid and abrasive resistent surface for laying on roads and aircraft runways and the like. Further traffic markings and aids such as arrows, white lines and cats' eyes may also be produced by the same method.

Typical compositions of a material suitable for use on the surface of a road or runway are as follows:

(a)

100 p.b.w. orthophthalic polyester resin
10 p.b.w. silicone dioxide
100 p.b.w. calcium silicate
2 p.b.w. benzoyl peroxide (b)

100 p.b.w. epoxy resin
50 p.b.w. hardener
200 p.b.w. pitch/tar
50 p.b.w. talc (c)

100 p.b.w. portland cement
5 p.b.w. epoxy resin
20 p.b.w. water
50 p.b.w. fine sand
5 p.b.w. epoxy hardener The aggregate material should be as abrasive as possible and may vary in size from 1/32 inch to 3/8 inch depending on the surface properties required.

The moulded articles or tile like pieces, can be produced in a wide variety of sizes, shapes and configurations and the gap between the pieces may be varied according to requirements. The width of the gap may be typically 2 inches.

Since the tile-like pieces are attached together by the reinforcing mesh it is convenient to store them in a roll. When laying a road surface it is therefore possible to unroll the tile-like pieces on to (e.g.) a concrete surface before the concrete has set hard and then to lightly press the tiles so that the reinforcing mesh becomes embedded in the concrete and the tiles are firmly retained. Alternatively, if it is desired to cover a hard surface with a cheap adhesive, such as an epoxy/tar adhesive, a rubber or resorcinol adhesive, an aqueous vinyl co-polymer in cement form, tar, bitumen or a suitable cement grouting screed is spread thinly on to the surface and the tile-like pieces are unrolled on top of the adhesive and pressed in.

It has been suggested above that the invention is applicable to the production of traffic markings such as arrows, white lines and cats' eyes and examples of compositions suitable for producing a number of common traffic markings are given below:

(1) Continuous white lines 100 p.b.w. Orthophthalic polyester resin
600 p.b.w Aluminium silicate aggregate (1/16 inch particle size)
2% by weight benzoyl peroxide
1% by weight white pigment (2) Semi-continuous white lines 100 p.b.w. Orthophthalic polyester resin
450 p.b. w. sand
50 p.b.w. ground mica or glass beads or spheres
2% b.w. benzoyl peroxide
1% b.w. white pigment (3) "No-parking" lines 100 p.b.w. Orthophthalic polyester resin
200 p.b.w. calcined flint aggregate (particle size 1/8 inch)
2% b.w. benzoyl peroxide
5% b.w. yellow pigment (4) "Cats' eyes"

100 p.b.w. Orthophthalic polyester resin
100 p.b.w. calcined bauxite aggregate (particle size 1/16 inch)
100 p.b.w. glass beads or spheres or aluminium ground flake
2% b.w. benzoyl peroxide (5) Pedestrian crossings 100 p.b.w. Orthophthalic polyester resin
100 p.b.w. corborundum grit (1/4 inch particle size)
100 p.b.w. aluminium silicate (1/4 inch particle size)
2% b.w. benzoyl peroxide
5% b.w. white pigment Moulded traffic markings of the type described may be produced simultaneously with the tile-like pieces of a road surface.

However, it will be appreciated that a number of minor modifications to the apparatus described would be necessary in order that, for example, two different settable binding materials can be simultaneously dispensed on to the moulded conveyor belt.

I claim:

1. Apparatus for moulding a plurality of articles which comprises a displaceable conveyor belt having on one face a plurality of open mould cavities, a hopper adapted to feed a granular or particulate filler material on to the surface of said conveyor to fill said mould cavities, means to supply a layer of foraminous material over a plurality of said mould cavities after said granular or particulate material has been placed therein, means for applying a coating of binding material to the filler material in said mould cavities and press means for pressing the foraminous layer into the surface of the filler material in the mould cavities and for distributing the binding material therein, said belt being displaceable relative to the press means and including one or more longitudinally extending side channels for receiving excess of at least one of the filler and binding material.

2. Apparatus according to claim 1 and having means causing the granular or particulate material to be precoated or mixed with the binding material prior to entering the moulds.

3. Apparatus according to claim 1 wherein the conveyor belt is passed between upper and lower platens of the press means.

4. Apparatus according to claim 3 wherein the lower platen of the press means supports a conveyor belt formed with mould cavities.

5. Apparatus according to claim 3 wherein the upper platen supports an endless conveyor belt having upper and lower runs and carrying open moulds above which are arranged the first and second dispensers so disposed with respect to the direction of motion of the conveyor belt that the foraminous layer acts to retain the filler material in the moulds when the belt passes along its lower run and the moulds are inverted by the upper run of said belt prior to their entry into the press means.

6. Apparatus according to claim 5 which includes a further dispenser arranged to apply the binding material to a film of plastics material dispensed on to a conveyor belt forming an extension to the lower platen of the press means and wherein the film coated with settable binding material is applied to the foraminous layer on its entry into the press means.

7. Apparatus according to claim 1 wherein said means for applying binding material to the filler material comprises means for applying said binder to the surface of the mould cavities before the latter are filled with filler material.

8. Apparatus according to claim 1 wherein said means for applying binding material to the filler material comprises means for applying said binder material to the surface of the filler material when filled into said mould cavities.

9. Apparatus according to claim 1 wherein said means for applying binding material to the filler material comprises means for applying the binder material to the layer of foraminous material covering said filled mould cavities.

References Cited
UNITED STATES PATENTS

| | | | |
|---|---|---|---|
| 1,862,318 | 6/1932 | Ruby | 264—112 X |
| 3,565,650 | 2/1971 | Cordon | 264—112 X |
| 2,183,520 | 12/1939 | Dehoef | 264—112 |
| 2,509,354 | 5/1950 | Jones et al. | 18—5 A |
| 3,099,518 | 7/1963 | Wetzler | 18—4 BX |
| 3,340,568 | 9/1967 | Wolpa et al. | 18—4 P |

ROBERT L. SPICER, Jr., Primary Examiner

U.S. Cl. X.R.

425—128, 120, 220